United States Patent [19]

Lemelstrich

[11] 4,281,798
[45] Aug. 4, 1981

[54] DRIP OR TRICKLE EMITTER
[76] Inventor: Noam Lemelstrich, Industrial Zone, Netanya, Israel
[21] Appl. No.: 73,313
[22] Filed: Sep. 7, 1979
[30] Foreign Application Priority Data
  Sep. 7, 1978 [IL] Israel .......................................... 55533
[51] Int. Cl.³ ............................................ B05B 15/00
[52] U.S. Cl. ................................................. 239/542
[58] Field of Search ................ 239/542, 547; 138/42, 138/43

[56] References Cited
U.S. PATENT DOCUMENTS 3,729,142  4/1973  Rangel-Garza et al. ............. 239/542
3,834,628  9/1974  Selman ................................. 239/542
3,998,391  12/1976 Lemelstrich ......................... 239/542
4,121,771  10/1978 Hendrickson ..................... 239/542 X FOREIGN PATENT DOCUMENTS
2224320 12/1972 Fed. Rep. of Germany ........... 239/542

Primary Examiner—Johnny D. Cherry
Attorney, Agent, or Firm—Fleit & Jacobson

[57] ABSTRACT

A drip or trickle emitter for use in field and crop irrigation is of outwardly pill-box like appearance, consisting of a first outer cylinderical cup shaped body and a second inner equally cup shaped body fitting into the first one, the open sides of these bodies facing opposite directions, one of the bodies having in its wall a tortuous, continuous groove.

8 Claims, 3 Drawing Figures

DRIP OR TRICKLE EMITTER

BACKGROUND OF INVENTION

The present invention relates to a drip emitter for irrigation purposes. More particularly the invention concerns the improvement of an emitter produced by the present applicant.

The said emitter comprises two tubular members, one of which is provided with a continuously direction turning groove, the two members, when assembled, forming a continuous tortuous path for the flow of water within the emitter device. There are provided an inlet for the flow and an outlet from the device.

The tortuous path reduces the speed of flow and the bows and bends which the flow has to follow result in a reduction of pressure and thus in a practically pressureless emission in the form of a slow trickle or drop-wise.

STATE OF KNOWN ART

There is also known a drip and trickle emitter which outwardly is of pill-box shape and which is composed of at least three parts. A first outer cup shaped housing part and an equally cup shaped second part, and a third disc shaped part which on both sides thereof carries a labyrinthine groove. The two grooves intercommunicate, there is an inlet spigot on one of the two cup shaped parts and an outlet on the other cup shaped parts.

This drip emitter has a number of drawbacks which I try to eliminate by my present construction.

The fact that three parts have to be mounted together to form the final drip emitting device does not facilitate the manual work of the assembling labourers. Further, the provision of the labyrinth on the two faces of a disc—in practice a membrane of yielding material—detracts from the necessary tightness of the flow path.

A great number of experiments and practical tests have led me to the design of a drip or trickle emitter which is based on the main features of the emitter according to the above-mentioned known emitter, which, however, is of a specific design which according to field tests ensures an especially good performance.

OBJECTS OF INVENTION

It is thus the object of the present invention to provide drip or trickle emitter for irrigation purposes which is of superior performance as compared with known designs and which can be manufactured at low cost and thus can be supplied to the ultimate buyer and user at a price which makes the device practically expendable. This is of advantage in all those situations and locations where due to impurity of water or strange bodies in the latter, there is a likelihood of stoppage, due to clogging of the flow path in the emitter.

While the first named earlier emitter is mainly intended for "in line" use the present design is exclusively of the "on line" type.

SHORT SUMMARY OF DISCLOSURE

According to the invention there is provided a device of outwardly pill-box like appearance, the said device consisting of a first and outer cylindrical cup shaped body and a second inner equally cup shaped body, the second cup shaped body being designed, shaped and dimensioned to be force-fittable into the first cup shaped body, the open sides of the two cup shaped bodies facing opposite directions, one of the bodies having in its wall a tortuous, continuous groove ascribing multiple bows and bends and forming with the wall of the other body a flow path, an inlet into the assembled unit being provided and an outlet therefrom.

According to a preferred practical embodiment, the inner wall of the outer cup forms a truncated conical space of slight conicity.

According to another preferred embodiment of the new device there is provided in the centre of one of the cups an inlet which takes the shape of a pointed spigot which is adapted to be pushed into an aperture of a hose.

According to another feature, the outer cup has a circular groove in the inner side of its top (or bottom) wall into which groove the edge of the inner cup can enter.

SHORT DESCRIPTION OF DRAWINGS

The invention will now be described with reference to the annexed drawing in which FIG. 1 shows the new device partly in section and partly in elevation.

DESCRIPTION OF PREFERRED EMBODIMENT

Figure 1:
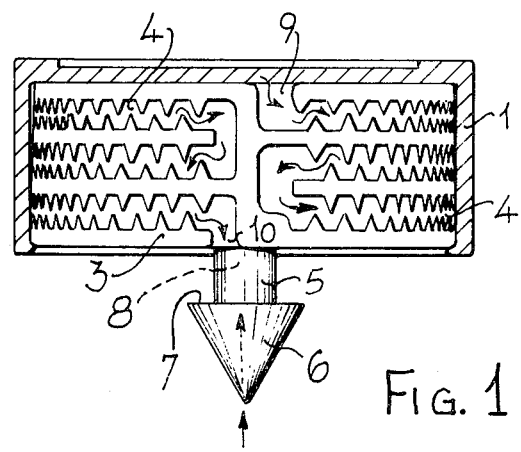
Figure 2:
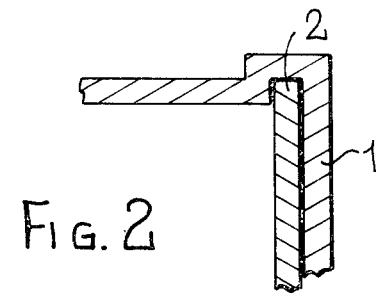
FIG. 2 is a fractional, elevational section of the new device.

The new device comprises an outer cylindrical, inverted cup 1 (seen in FIG. 1 in axial section). In the top wall of cup 1 is provided a circular groove 2. The inner cavity of the outer cup shaped part 1 is of slightly conical shape i.e. forms a truncated cone. Of course, the conicity is minimal and can hardly be discerned without measuring it with precise measuring instruments. However, this feature results in a tight fit of the inner in the outer cup shaped part and in fully flow-insulating the flow parts within the drip emitter.

Into cup 1 is force fitted a second, inner cup 3 in the outer wall of which extends a continuous groove 4. (The inner cup 3 is shown in elevation).

As can be seen, its edge is received in the groove 2. The cup 3 fits tightly into cup 1 and the smooth inner wall of cup 1 seals the groove 4 at its open side. From the bottom of cup 3 extends a spigot 5 having a cone shaped head 6 forming a shoulder 7. In the head 6 there is provided an opening leading into a bore 8 which in turn leads into the interior of cup 3. At the top of cup 3, i.e. its open side, at 9 the groove 4 commences, extending continuously on the wall of the cup 3 to an outlet 10.

Figure 3:
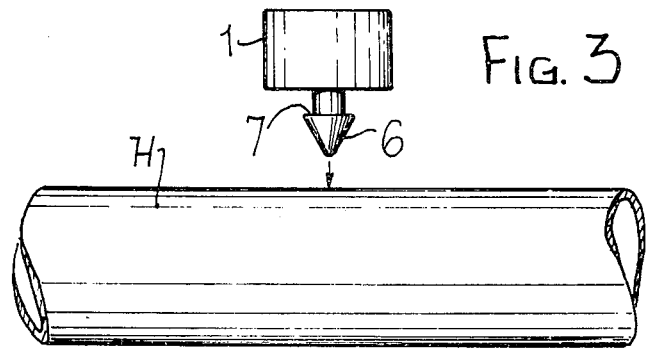
FIG. 3 illustrates the device in position of use.

In use of the new trickle or drip emitter the head 6 is forced into a hole made in a rubber or plastic hose H (FIG. 3). The elastic material of the hose applies itself to the shoulder 7, ensuring a tight passage from the hose to the emitter.

Water enters the spigot and rises into the interior of the inner cup 3. It flows out of the latter at 9 and travels all along the groove 4 to the outlet 10 from which it leaves in the form of a slow trickle or dropwise.

Certain variations would be within the scope of the invention. The spigot 5 could be positioned on the top of cup 1. The groove 4 need not be in the wall of cup 3, but in that of the wall of cup 1.

It has been found that the new device can be made in very small dimension, say being of a diameter of 10 mm and a height of 10 mm.

Accordingly, it can be supplied at low cost and is expendable when clogged by dirt.

The conicity imparted to the inner cavity of the outer cup ensures a tight fit of the second in the first cup, fully sealing the groove, without employing any packing or tightening means.

The advantage of the new drip emitter is thus in its simple constructions permitting quick and simple steps of assembly, i.e. just forcing one cup into the other, no matter what the relative rotational position of the two cups is.

What is claimed is:

1. A drip or trickle emitter device of outwardly pillbox like appearance, the said device consisting of a first and outer cylindrical cup shaped body and a second inner equally cup shaped body, with both cup shaped bodies having one open side, the inner wall of the first cup shaped body forming a truncated conical space of slight conicity, the second cup shaped body being designed, shaped and dimensioned to be force-fittable into the first cup shaped body, and the open sides of the two cup shaped bodies facing opposite directions, one of the bodies having in its wall a tortuous, continuous groove ascribing multiple bows and bends and forming with the wall of the other body a flow path, a circular groove being provided in the top wall of the said outer cup shaped body into which circular groove the edge of the inner cup shaped body fittingly enters, the assembled device being provided with an inlet into the device and an outlet therefrom.

2. A drip or trickle emitter device as claimed in claim 1, wherein the said continuous, tortuous groove is provided in the outer wall of the second, inner cup shaped body.

3. A drip or trickle emitter device as claimed in claim 1, wherein said inlet is provided in the center of one of the cup shaped bodies, as an inlet which takes the shape of a pointed spigot which is adapted to be pushed into an aperture in the wall of a hose.

4. A drip or trickle emitter device as claimed in claim 3, wherein the said spigot is provided on the inner cup shaped body.

5. A drip or trickle emitter device as claimed in claim 3, wherein the device is structured such that when the spigot is pushed into the aperture in the wall of the hose, the device is capable of feeding all water entering it from the hose through the flow path and out of the device, such that when the device is located adjacent to the soil, said water contacts the soil.

6. A drip or trickle emitter device as claimed in claim 1 or claim 5, wherein the device is structured such that when assembled, it is capable of being attached to a hose only at the inlet of the device.

7. A drip or trickle emitter device as claimed in claim 1, wherein the inlet is capable of being inserted into an aperture in a hose.

8. A drip or trickle emitter device as claimed in claim 1, wherein the device is structured so that it does not include a screw thread located in any or one of its members, and does not include a flange protruding from the wall of one of the cup shaped bodies adaptable to mate with a hole in the wall of the other cup shaped body.

* * * * *